United States Patent
He et al.

(10) Patent No.: US 11,978,245 B2
(45) Date of Patent: May 7, 2024

(54) METHOD AND APPARATUS FOR GENERATING IMAGE

(71) Applicant: Baidu Online Network Technology (Beijing) Co., Ltd., Beijing (CN)

(72) Inventors: Tao He, Beijing (CN); Gang Zhang, Beijing (CN); Jingtuo Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 1512 days.

(21) Appl. No.: 16/050,329

(22) Filed: Jul. 31, 2018

(65) Prior Publication Data
US 2019/0080148 A1 Mar. 14, 2019

(30) Foreign Application Priority Data
Sep. 8, 2017 (CN) .......................... 201710806070.X

(51) Int. Cl.
*G06V 10/82* (2022.01)
*G06F 18/214* (2023.01)
(Continued)

(52) U.S. Cl.
CPC ............ *G06V 10/82* (2022.01); *G06F 18/214* (2023.01); *G06F 18/2413* (2023.01);
(Continued)

(58) Field of Classification Search
CPC .. G06V 40/165; G06V 40/167; G06V 40/168; G06V 40/172; G06V 10/764;
(Continued)

(56) References Cited

U.S. PATENT DOCUMENTS 10,701,394 B1 * 6/2020 Caballero ............. G06N 3/045
2017/0193286 A1 7/2017 Zhou et al.
(Continued)

FOREIGN PATENT DOCUMENTS

CN 106127103 A 11/2016
CN 106204440 A 12/2016
(Continued)

*Primary Examiner* — Chan S Park
*Assistant Examiner* — Daniel C Chang
(74) *Attorney, Agent, or Firm* — Knobbe, Martens, Olson & Bear, LLP

(57) ABSTRACT

The present disclosure discloses a method and apparatus for generating an image. A specific embodiment of the method comprises: acquiring at least two frames of facial images extracted from a target video; and inputting the at least two frames of facial images into a pre-trained generative model to generate a single facial image. The generative model updates a model parameter using a loss function in a training process, and the loss function is determined based on a probability of the single facial generative image being a real facial image and a similarity between the single facial generative image and a standard facial image. According to this embodiment, authenticity of the single facial image generated by the generative model may be enhanced, and then a quality of a facial image obtained based on the video is improved.

15 Claims, 3 Drawing Sheets

(51) Int. Cl.
  *G06F 18/2413* (2023.01)
  *G06N 3/044* (2023.01)
  *G06N 3/045* (2023.01)
  *G06N 3/047* (2023.01)
  *G06N 3/08* (2023.01)
  *G06N 3/084* (2023.01)
  *G06N 7/00* (2023.01)
  *G06N 7/01* (2023.01)
  *G06N 20/00* (2019.01)
  *G06N 20/10* (2019.01)
  *G06T 7/00* (2017.01)
  *G06T 7/246* (2017.01)
  *G06T 11/00* (2006.01)
  *G06V 10/764* (2022.01)
  *G06V 40/16* (2022.01)

(52) U.S. Cl.
  CPC .............. *G06N 3/044* (2023.01); *G06N 3/045* (2023.01); *G06N 3/047* (2023.01); *G06N 3/08* (2013.01); *G06N 3/084* (2013.01); *G06N 7/00* (2013.01); *G06N 20/00* (2019.01); *G06T 7/251* (2017.01); *G06T 7/97* (2017.01); *G06T 11/00* (2013.01); *G06V 10/764* (2022.01); *G06V 40/165* (2022.01); *G06V 40/167* (2022.01); *G06V 40/168* (2022.01); *G06V 40/172* (2022.01); *G06N 7/01* (2023.01); *G06N 20/10* (2019.01); *G06T 2207/20081* (2013.01); *G06T 2207/30201* (2013.01)

(58) Field of Classification Search
  CPC ...... G06V 10/82; G06K 9/6256; G06K 9/627; G06N 3/0445; G06N 3/0454; G06N 3/0472; G06N 3/08; G06N 3/084; G06N 7/00; G06N 20/00; G06N 7/005; G06N 20/10; G06N 3/044; G06N 3/045; G06N 3/047; G06N 7/01; G06T 7/251; G06T 7/97; G06T 11/00; G06T 2207/20081; G06T 2207/30201; G06F 18/214; G06F 18/2413
  See application file for complete search history.

(56) References Cited

U.S. PATENT DOCUMENTS

2018/0114056 A1* 4/2018 Wang ................. G06V 10/7715
2019/0012581 A1* 1/2019 Honkala .............. G06V 10/758
2019/0205334 A1* 7/2019 Kim ...................... G06T 1/0007

FOREIGN PATENT DOCUMENTS

| CN | 106296586 A | 1/2017 | |
| CN | 106600536 A | 4/2017 | |
| CN | 106845421 A | 6/2017 | |
| CN | 106952239 A | 7/2017 | |
| WO | WO-2019015466 A1 * | 1/2019 | ......... G06K 9/00228 |

* cited by examiner

METHOD AND APPARATUS FOR GENERATING IMAGE

CROSS-REFERENCE TO RELATED APPLICATION

This application claims priority to Chinese Patent Application No. 201710806070.X, filed on Sep. 8, 2017, titled "Method and Apparatus for Generating Image," which is hereby incorporated by reference in its entirety.

TECHNICAL FIELD

The present disclosure relates to the field of computer technology, specifically to the image processing field, and more specifically to a method and apparatus for generating an image.

BACKGROUND

In recent years, as the facial recognition technology develops rapidly, the field of its application become more and more wide. A video is affected by external factors (e.g., noise and light) in the shooting process, and there are a large number faces having poor-qualities and large poses in the video. All of these problems bring significant interference to facial recognition, resulting in a poor facial recognition effect, so that for example, a clear and real facial image cannot be recognized from the video. Or as another example, A in the video is incorrectly recognized as B. These problems will cause great inconvenience to the subsequent work. Therefore, how to acquire a high-quality facial image from the video and ensure that the acquired facial image is a facial image of the person in the video is an urgent problem to be solved.

SUMMARY

The objective of the present disclosure is to provide an improved method and apparatus for generating an image to solve the technical problems mentioned in the foregoing background section.

In a first aspect, some embodiments of the present disclosure provide a method for generating an image. The method comprises: acquiring at least two frames of facial images extracted from a target video; and inputting the at least two frames of facial images into a pre-trained generative model to generate a single facial image. The generative model is obtained through the following training steps: inputting a single facial generative image outputted by an initial generative model into a pre-trained discriminative model to generate a probability of the single facial generative image being a real facial image; determining a loss function of the initial generative model based on the probability and a similarity between the single facial generative image and a standard facial image, the standard facial image and the single facial generative image containing facial information of a same person; and updating a model parameter of the initial generative model using the loss function to obtain the generative model.

In some embodiments, the determining a loss function of the initial generative model comprises: extracting respectively, using a pre-trained recognition model, feature information of the single facial generative image and feature information of the standard facial image, and calculating a Euclidean distance between the feature information of the single facial generative image and the feature information of the standard facial image; and obtaining the loss function of the initial generative model according to the probability and the Euclidean distance.

In some embodiments, the initial generative model is trained and obtained by: using at least two frames of initial training facial sample images extracted from an initial training video as an input, and using a preset initial training facial image as an output by using a machine learning method, the at least two frames of initial training facial sample images and the initial training facial image containing the facial information of the same person.

In some embodiments, the discriminative model is trained and obtained by: using a first sample image as an input and use annotation information of the first sample image as an output by using the machine learning method, the first sample image including a positive sample image with annotation information and a negative sample image with annotation information, where the negative sample image is an image outputted by the generative model.

In some embodiments, the recognition model is trained and obtained by: using a second sample image as an input and feature information of the second sample image as an output by using the machine learning method.

In some embodiments, the generative model is a Long-Short Term Memory Model.

In a second aspect, some embodiments of the present disclosure provide an apparatus for generating an image. The apparatus comprises: an acquiring unit, configured to acquire at least two frames of facial images extracted from a target video; a generating unit, configured to input the at least two frames of facial images into a pre-trained generative model to generate a single facial image; and a generative model training unit, configured to train the generative model. The generative model training unit comprises: a probability generating unit, configured to input a single facial generative image outputted by an initial generative model into a pre-trained discriminative model to generate a probability of the single facial generative image being a real facial image; a determining unit, configured to determine a loss function of the initial generative model based on the probability and a similarity between the single facial generative image and a standard facial image, the standard facial image and the single facial generative image containing facial information of a same person; and an updating unit, configured to update a model parameter of the initial generative model using the loss function to obtain the generative model.

In some embodiments, the determining unit is further configured to: extract respectively, using a pre-trained recognition model, feature information of the single facial generative image and feature information of the standard facial image, and calculate a Euclidean distance between the feature information of the single facial generative image and the feature information of the standard facial image; and obtain the loss function of the initial generative model based on the probability and the Euclidean distance.

In some embodiments, the apparatus further comprises an initial generative model generating unit. The initial generative model generating unit is configured to: use at least two frames of initial training facial sample images extracted from an initial training video as an input, and use a preset initial training facial image as an output by using a machine learning method to train and obtain the initial generative model. The at least two frames of initial training facial sample images and the initial training facial image contain the facial information of the same person.

In some embodiments, the apparatus further comprises a discriminative model training unit. The discriminative model training unit is configured to: use a first sample image as an input and use annotation information of the first sample image as an output by using the machine learning method to train and obtain the discriminative model. The first sample image includes a positive sample image with annotation information and a negative sample image with annotation information. The negative sample image is an image outputted by the generative model.

In some embodiments, the apparatus further comprises a recognition model training unit. The recognition model training unit is configured to: use a second sample image as an input and feature information of the second sample image as an output by using the machine learning method to train and obtain the recognition model.

In some embodiments, the generative model is a Long-Short Term Memory Model.

In a third aspect, some embodiments of the present disclosure provide a terminal. The terminal comprises: one or more processors; and a storage device, configured to store one or more programs. The one or more programs, when executed by the one or more processors, cause the one or more processors to implement the method as described in any embodiment in the first aspect.

In a fourth aspect, some embodiments of the present disclosure provide a computer readable storage medium storing a computer program. The computer program, when executed by a processor, implements the method as described in any embodiment in the first aspect.

According to the method and apparatus for generating an image provided by some embodiments of the present disclosure, the single facial image is generated using the at least two frames of facial images extracted from the target video based on the pre-trained generative model. The generative model updates the model parameter using the loss function in the training process, and the loss function is determined based on the probability of the single facial generative image being the real facial image and the similarity between the single facial generative image and the standard facial image. Therefore, the authenticity of the single facial image generated by the generative model may be enhanced, and then the quality of the facial image obtained based on the video is improved.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
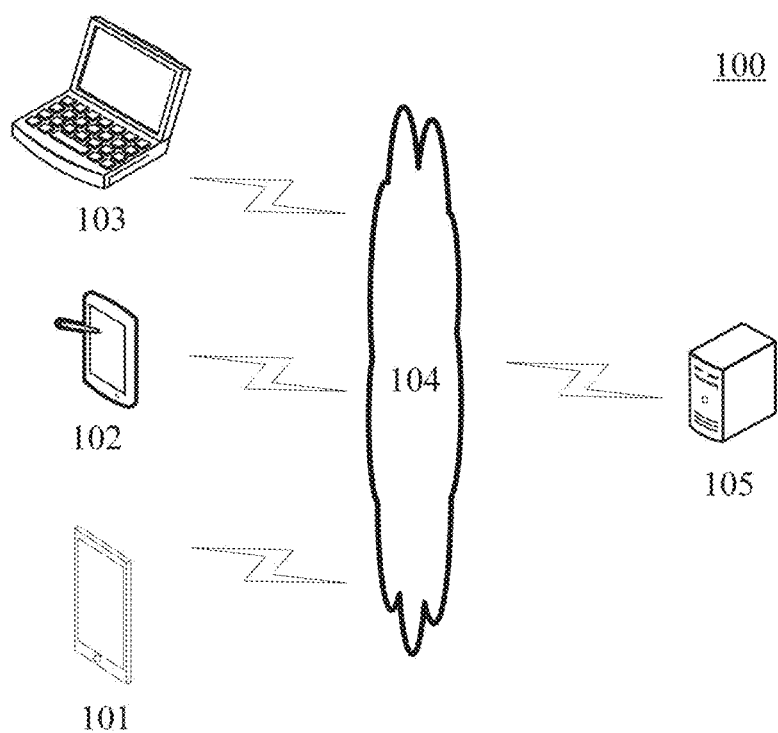
FIG. 1 is a system architecture diagram applicable to some embodiments of the present disclosure.

FIG. 1 shows a architecture 100 which may be used by an image generating method or an image generating apparatus according to some embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as game applications, animation presenting applications, instant messaging tools, and social platform software may be installed on the terminal devices 101, 102 and 103.

The terminal devices 101, 102 and 103 may be various electronic devices having display screens and supporting image display, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend server supporting an image or a graph displayed by the terminal devices 101, 102 or 103. The backend server may return data (such as image data) to the terminal devices, for presentation on the terminal devices.

It should be noted that the image generation method according to some embodiments of the present disclosure may be executed by the terminal devices 101, 102 and 103, the server 105, or the combination thereof. Accordingly, an image generation apparatus may be disposed on the server 105, on the terminal devices 101, 102 and 103, or partially on the server 105 and partially on the terminal devices 101, 102 and 103. The disclosure is not limited in this regard.

It should be understood that the numbers of the terminal devices, the networks and the servers in FIG. 1 are merely illustrative. Any number of terminal devices, networks and servers may be provided based on the actual requirements.

Figure 2:
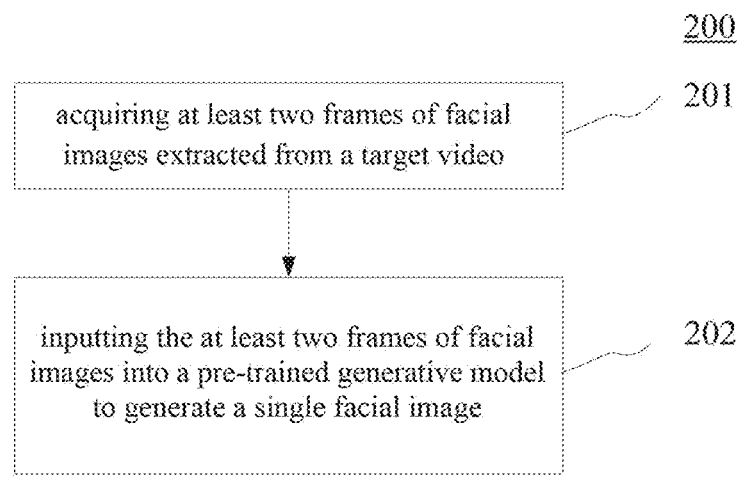
FIG. 2 is a flowchart of an embodiment of a method for generating an image according to the present disclosure.

Further referring to FIG. 2, which illustrates a flow 200 of an embodiment of a method for generating an image according to the present disclosure. The method for generating an image includes steps 201 and 202.

Step 201 includes acquiring at least two frames of facial images extracted from a target video.

In some embodiments, an electronic device (for example, the terminal devices 101, 102 and 103 or the server 105 as illustrated in FIG. 1) on which the method for generating an image is performed may locally or remotely acquire the at least two frames of facial images extracted from the target video. The at least two frames of facial images are facial images of a same person. The at least two frames of facial images may be a sequence of facial images of the same person extracted from a same target video. The at least two frames of facial images extracted from the target video may be low-quality facial images, for example, facial images having problems such as noise, blurring, low resolution, and large facial pose.

Step 202 includes inputting the at least two frames of facial images into a pre-trained generative model to generate a single facial image.

In some embodiments, based on the at least two frames of facial images acquired in step 201, the electronic device may input the at least two frames of facial images into the pre-trained generative model to generate the single facial image. The single facial image may be a high-quality facial image whose image resolution higher than a preset first resolution threshold which does not have problems such as noise, blurring, dim, or overexposure. Here, the first resolution threshold may be manually set according to actual needs.

Here, the generative model may be obtained by the electronic device or other electronic devices for training the generative model through the following training steps. First, a single facial generative image outputted by an initial generative model may be inputted into a pre-trained discriminative model to generate a probability of the single facial generative image being a real facial image. The initial generative model may be a neural network model obtained in various ways. For example, based on the existing neural network (e.g., a Long-Short Term Memory network), network parameters of a neural network are randomly generated, to obtain the neural network model. Then, a loss function of the initial generative model is determined based on the probability and a similarity (e.g., a cosine similarity, a Jaccard similarity coefficient, and a Euclidean distance) between the single facial generative image and a standard facial image. The standard facial image and the single facial generative image contain facial information of the same person. Here, the standard facial image may be a preset high-quality facial image which does not have problems such as noise, blurring, dim, or overexposure. For example, the standard facial image may be a pre-captured high-quality facial image meeting a requirement, and may also be an identification photo and so on. Finally, a model parameter of the initial generative model may be updated using the loss function to obtain the generative model. For example, the loss function is backward propagated to the initial generative model to update the model parameter of the initial generative model. It should be noted that the training process for the generative model is only used to explain the adjusting process for the parameter of the generative model. It may be considered that the initial generative model is a model whose parameter is not adjusted and the generative model is a model whose parameter is adjusted. The adjusting process for the model parameter is not only limited to once, but may be repeated many times according to a degree of optimization of the model, actual needs, etc.

Common generative models may include, but not limited to, a deep neural network model, a Hidden Markov Model (HMM), a naive Bayesian model, a Gaussian mixture model, and the like. The above generative model may be a generative model contained in a generative adversarial network (GAN), and the generative adversarial network (GAN) is inspired from the two-player zero-sum game (two-player game) in the game theory. The generative model and a discriminative model are respectively served as the two game players in the GAN model. The generative model captures a distribution of sample data to generate a sample resembling real training data as much as possible. The discriminative model is a binary classifier for discriminating a probability of a sample coming from the real training data (rather than generated data of the generative model). Common discriminative models may include, but not limited to, a linear regression model, a linear discriminant analysis, a support vector machine (SVM), a neural network, etc. The generative model and the discriminative model may be simultaneously trained. When the discriminative model is fixed, a parameter of the generative model is adjusted. When the generative model is fixed, a parameter of the discriminative model is adjusted. In some embodiments, the generative model generates more and more realistic facial images through continuous learning; and the discriminative model enhances an ability to discriminate the generated facial image from the real facial image through continuous learning. Through the confrontation between the generative model and the discriminative model, finally, the facial image generated by the generative model is similar to the real facial image and thus successfully "cheats" the discriminative model. Such generative adversarial network may be used to increase the authenticity of the generated facial image.

In some alternative implementations of this embodiment, the determining the loss function of the initial generative model may specifically include the following steps. First, feature information of the single facial generative image and feature information of the standard facial image may be respectively extracted using a pre-trained recognition model, and a Euclidean distance between the feature information of the single facial generative image and the feature information of the standard facial image may be calculated. The standard facial image and the single facial generative image contain the facial information of the same person. Then, the loss function of the initial generative model may be obtained according to the probability and the Euclidean distance. In an actual training process of a deep neural network, in general, multiple pieces of sample data are simultaneously trained in one batch. In some alternative implementations, assuming that the loss function of the generative model is $J^{(G)}$, a calculation formula of $J^{(G)}$ may be:

$$J^{(G)} = -\tfrac{1}{2} E_x \log(D(x)) + \|F(x) - F(x_0)\|_2.$$

x represents the pixel matrix of the facial generative image. $D(x)$ represents the output of the discriminative model after x is inputted into the discriminative model. $E_x \log(D(x))$ represents the expectations of multiple $\log(D(x))$ when multiple x are simultaneously trained. $x_0$ represents the pixel matrix of the standard facial image. $F(x_0)$ represents the feature vector outputted from the recognition model after the standard facial image is inputted into the recognition model. $\|F(x)-F(x_0)\|_2$ represents the 2-norm of $F(x)$ and $F(x_0)$ used to represent the Euclidean distance between $F(x)$ and $F(x_0)$. The addition of the Euclidean distances between $F(x)$ and $F(x_0)$ to the loss function $J^{(G)}$ of the generative model is used to ensure that the Euclidean distance between the feature information of the facial image outputted by the generative model and the feature information of the standard facial image is as small as possible, thereby ensuring the similarity between the generated facial image and the standard facial image. That is, it is ensured that the generated facial image is a facial image of the person in the video.

In some alternative implementations, the initial generative model may be trained and obtained in the following way. The electronic device or other electronic devices for training the initial generative model may use at least two frames of initial training facial sample images extracted from an initial training video as an input, and use a preset initial training facial image as an output by using a machine learning method (e.g., the Long-Short Term Memory network) to train and obtain the initial generative model. The initial training facial image may be a facial image whose image resolution exceeding the first resolution threshold. The at least two frames of initial training facial sample images and the initial training facial image contain the facial information of the same person, and the initial training facial image is a high-quality facial image without problems such as noise, blurring, dim, or overexposure.

In some alternative implementations, the discriminative model may be trained and obtained in the following way. The electronic device or other electronic devices for training the discriminative model may use a first sample image as an input and use annotation information of the first sample image as an output by using the machine learning method to train and obtain the discriminative model. The first sample image includes a positive sample image with annotation information and a negative sample image with annotation information. The positive sample image may be a real facial image whose image resolution higher than the first resolution threshold. The negative sample image is an image outputted by the generative model. For example, in the training process for the discriminative model, the real facial image may be used as a facial positive sample image and annotated as 1, and the mage outputted by the generative model may be used as a facial negative sample image and annotated as 0. A loss function of the discriminative model is calculated, and the loss function of the discriminative model is backward propagated to the discriminative model to update a model parameter of the discriminative model using the loss function, thus implementing the adjustment of the parameter of the discriminative model. In some alternative implementations, assuming that the loss function of the discriminative model is $J^{(D)}$, a calculation formula of $J^{(D)}$ is:

$$J^{(D)} = -\tfrac{1}{2} E_{x_1} \log(D(x_1)) - \tfrac{1}{2} E_x \log(1 - D(x)).$$

$x_1$ represents the pixel matrix of the real facial image whose image resolution higher than the first resolution threshold. $D(x_1)$ represents the output of the discriminative module after $x_1$ is inputted into the discriminative model. $E_x \log(D(x_1))$ represents the expectations of multiple $\log(D(x_1))$ when multiple $x_1$ are simultaneously trained. x represents the pixel matrix of the facial generative image. $D(x)$ represents the output of the discriminative model after x is inputted into the discriminative model. $E_x \log(1-D(x))$ represents the expectations of multiple $\log(1-D(x))$ when multiple x are simultaneously trained. The discriminative model may be a convolutional neural network model.

In some alternative implementations, the recognition model may be trained and obtained in the following way. The electronic device or other electronic devices for training the recognition model may use a second sample image as an input and feature information of the second sample image as an output by using the machine learning method to train and obtain the recognition model. The second sample image is a facial image. The feature information of the second sample image may refer to a feature vector representing a human face, such as a 512-dimensional feature vector representing a human face.

In some alternative implementations, the generative model may be a Long-Short Term Memory (LSTM) model. LSTM is a time-recursive neural network that is suitable for processing and predicting important events having relatively long intervals and delays in time series. When generating the single facial image based on the at least two frames of facial images extracted from the target video, LSTM may make full use of the time sequence of the at least two frames of facial images in the video, thereby improving the quality of the generated facial image.

Figure 3:
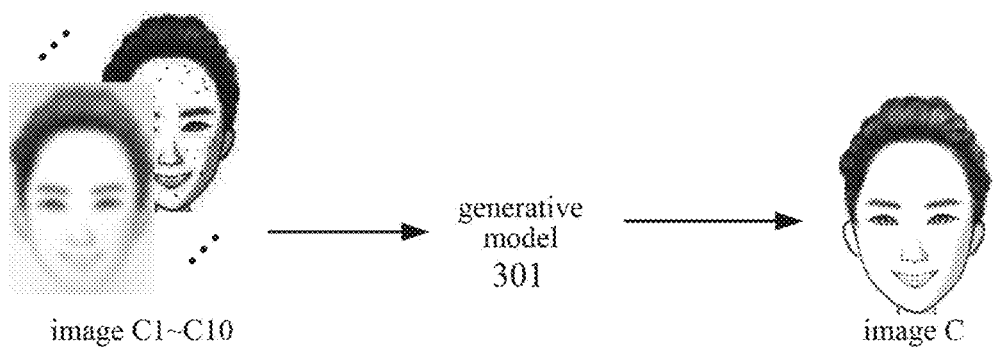
FIG. 3 is a schematic diagram of an application scenario of the method for generating an image according to some embodiments of the present disclosure.

Further referring to FIG. 3, which is a schematic diagram of an application scenario of the method for generating an image according to some embodiments. In the application scenario of FIG. 3, first, a terminal device (e.g., a mobile phone, and a computer) acquires 10 frames of facial images C1-C10 extracted from a target video. The 10 frames of images have problems such as noise, blurring, low resolution and large face pose. The terminal device inputs the acquired 10 frames of facial images C1-C10 into the pre-trained generative model 301, and the generative model 301 generates the facial image C. The facial image C is a high-quality facial image which does not have problems such as noise, blurring, low resolution and large face pose. It should be noted that the images in FIG. 3 are merely used to schematically explain a process of generating a single facial image based on at least two frames of facial images extracted from a target video, rather than limit contents and a number of the input images or the like.

According to the method provided in some embodiments of the present disclosure, the facial image is generated using the pre-trained generative model. The generative model updates the model parameter using the loss function in the training process, and the loss function is determined based on the probability of the single facial generative image being the real facial image and the similarity between the single facial generative image and the standard facial image. Therefore, the authenticity of the single facial image generated by the generative model may be improved, and then the quality of the facial image obtained based on the video is improved.

Figure 4:
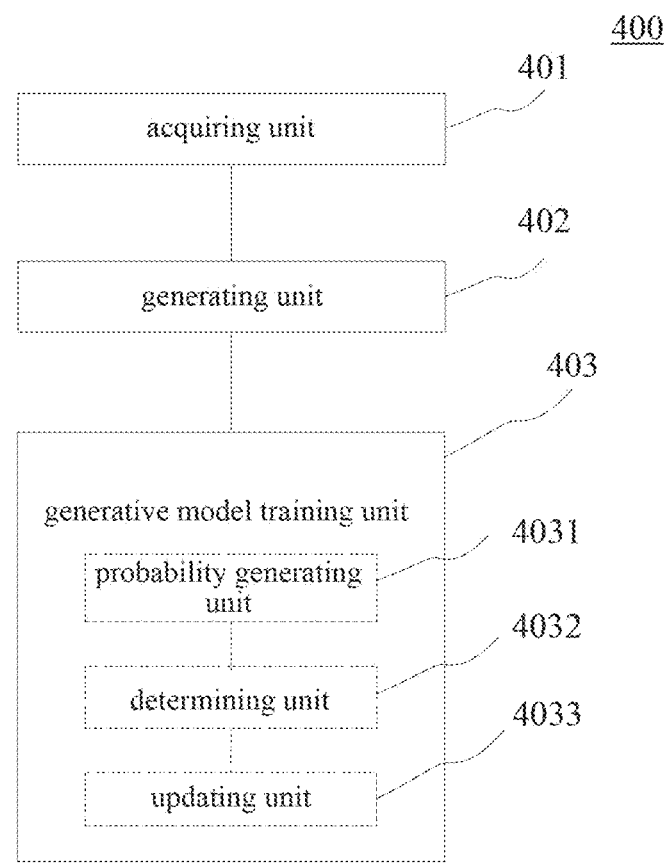
FIG. 4 is a schematic structural diagram of an embodiment of an apparatus for generating an image according to the present disclosure.

Further referring to FIG. 4, as an implementation of the method shown in the above-mentioned figures, the present disclosure provides an embodiment of an apparatus for generating an image. The embodiment of this apparatus corresponds to the embodiment of the method as illustrated in FIG. 2, and this apparatus may be applied in various electronic devices.

As shown in FIG. 4, the apparatus for generating an image 400 in some embodiments includes: an acquiring unit 401, a generating unit 402 and a generative model training unit 403. The acquiring unit 401 is configured to acquire at least two frames of facial images extracted from a target video. The generating unit 402 is configured to input the at least two frames of facial images into a pre-trained generative model to generate a single facial image. The generative model training unit 403 is configured to train the generative model. The generative model training unit 403 includes: a probability generating unit 4031, configured to input a single facial generative image outputted by an initial generative model into a pre-trained discriminative model to generate a probability of the single facial generative image being a real facial image; a determining unit 4032, configured to determine a loss function of the initial generative model based on the probability and a similarity between the single facial generative image and a standard facial image, wherein the standard facial image and the single facial generative image contain facial information of a same person; and an updating unit 4033, configured to update a model parameter of the initial generative model using the loss function to obtain the generative model. In some embodiments, for specific processes of the acquiring unit 401, the generating unit 402, and the generative model training unit 403 in the apparatus 400 for generating an image, and their technical effects, reference may be made to relative descriptions of step 201 and step 202 in the corresponding embodiment of FIG. 2 respectively, which will not be repeatedly described here.

In some alternative implementations of this embodiment, the determining unit 4032 is further configured to: extract respectively feature information of the single facial generative image and feature information of the standard facial image using a pre-trained recognition model, and calculate a Euclidean distance between the feature information of the single facial generative image and the feature information of the standard facial image; and obtain the loss function of the initial generative model based on the probability and the Euclidean distance.

In some alternative implementations of this embodiment, the apparatus further includes an initial generative model generating unit (not shown). The initial generative model generating unit is configured to: use at least two frames of initial training facial sample images extracted from an initial training video as an input, and use a preset initial training facial image as an output by using a machine learning method to train and obtain the initial generative model. The at least two frames of initial training facial sample images and the initial training facial image contain the facial information of the same person.

In some alternative implementations of this embodiment, the apparatus further includes a discriminative model training unit (not shown). The discriminative model training unit is configured to: use a first sample image as an input and use annotation information of the first sample image as an output by using the machine learning method to train and obtain the discriminative model. The first sample image includes a positive sample image with annotation information and a negative sample image with annotation information. The negative sample image is an image outputted by the generative model.

In some alternative implementations of this embodiment, the apparatus further includes a recognition model training unit (not shown). The recognition model training unit is configured to: use a second sample image as an input and feature information of the second sample image as an output by using the machine learning method to train and obtain the recognition model.

In some alternative implementations of this embodiment, the generative model is a Long-Short Term Memory Model.

Figure 5:
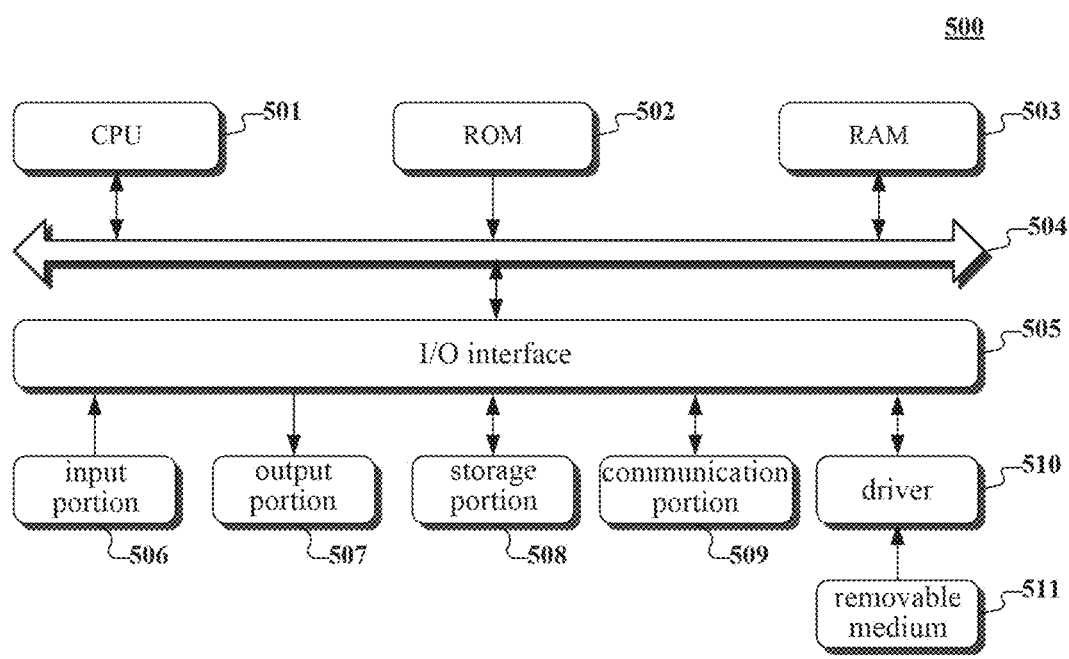
FIG. 5 is a schematic structural diagram of a computer system adapted to implement a terminal device according to some embodiments of the present disclosure.

Referring to FIG. 5, a schematic structural diagram of a computer system 500 adapted to implement a terminal device of some embodiments of the present disclosure is shown. The terminal device shown in FIG. 5 is only an example, and is not a limitation to the function and scope of the embodiments of the disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 including a cathode ray tube (CRT), a liquid crystal display device (LCD), a speaker etc.; a storage portion 508 including a hard disk and the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the installation of a computer program read from the removable medium 511 on the storage portion 508 as needed.

In particular, according to some embodiments of the present disclosure, the process described above with reference to the flow chart may be implemented in a computer software program. For example, an embodiment of the present disclosure includes a computer program product, which comprises a computer program that is loaded in a computer-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in some embodiments of the present disclosure may be implemented by means of software or hardware. The described units may also be provided in a processor, for example, described as: a processor, comprising an obtaining unit, a generating unit and a generative model unit, where the names of these units do not in some cases constitute a limitation to such units themselves. For example, the blocking unit may also be described as "a unit for acquiring at least two frames of facial images extracted from a target video."

In another aspect, some embodiments of the present disclosure further provide a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire at least two frames of facial images extracted from a target video; input the at least two frames of facial images into a pre-trained generative model to generate a single facial image. the generative model is obtained through: inputting a single facial generative image outputted by an initial generative model into a pre-trained discriminative model to generate a probability of the single facial generative image being a real facial image; determining a loss function of the initial generative model based on the probability and a similarity between the single facial generative image and a standard facial image, the standard facial image and the single facial generative image containing facial information of a given person; and updating a model parameter of the initial generative model using the loss function to obtain the generative model.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating an image, comprising:
acquiring at least two frames of facial images of a same person extracted from a target video; and
inputting the at least two frames of facial images of the same person into one pre-trained generative model to generate a single facial image, wherein the generative model is obtained through:
inputting a single facial generative image outputted by an initial generative model into a pre-trained discriminative model to generate a probability of the single facial generative image being a real facial image;
determining a loss function of the initial generative model based on the probability and a similarity between the single facial generative image and a standard facial image, the similarity including a Jaccard similarity coefficient between the single facial generative image and the standard facial image, or a Euclidean distance between the single facial generative image and the standard facial image, the standard facial image and the single facial generative image containing facial information of the same person; and
updating a model parameter of the initial generative model using the loss function determined based on the probability and the similarity to obtain the generative model,
wherein determining the loss function of the initial generative model comprises:
extracting respectively feature information of the single facial generative image and feature information of the standard facial image using a pre-trained recognition model, and calculating a Euclidean distance between the feature information of the single facial generative image and the feature information of the standard facial image; and
obtaining the loss function of the initial generative model according to the probability and the Euclidean distance, and
wherein the method is performed by at least one processor.

2. The method according to claim 1, wherein the initial generative model is trained and obtained by:
using at least two frames of initial training facial sample images extracted from an initial training video as an input, and using a preset initial training facial image as an output by using a machine learning method, the at least two frames of initial training facial sample images and the initial training facial image containing the facial information of the given person.

3. The method according to claim 1, wherein the discriminative model is trained and obtained by:
using a first sample image as an input and use annotation information of the first sample image as an output by using a machine learning method, the first sample image comprising a positive sample image with annotation information and a negative sample image with annotation information, wherein the negative sample image is an image outputted by the generative model.

4. The method according to claim 1, wherein the recognition model is trained and obtained by:
using a second sample image as an input and feature information of the second sample image as an output by using a machine learning method.

5. The method according to claim 1, wherein the generative model is a Long-Short Term Memory Model.

6. An apparatus for generating an image, comprising:
at least one processor; and
a memory storing instructions, the instructions when executed by the at least one processor, cause the at least one processor to perform operations, the operations comprising:
acquiring at least two frames of facial images of a same person extracted from a target video;

inputting the at least two frames of facial images of the same person into one pre-trained generative model to generate a single facial image; and training the generative model, wherein the generative model is obtained through:

inputting a single facial generative image outputted by an initial generative model into a pre-trained discriminative model to generate a probability of the single facial generative image being a real facial image;

determining a loss function of the initial generative model based on the probability and a similarity between the single facial generative image and a standard facial image, the similarity including a Jaccard similarity coefficient between the single facial generative image and the standard facial image, or a Euclidean distance between the single facial generative image and the standard facial image, the standard facial image and the single facial generative image containing facial information of the same person; and updating a model parameter of the initial generative model using the loss function determined based on the probability and the similarity to obtain the generative model, wherein determining the loss function of the initial generative model comprises:

extracting respectively feature information of the single facial generative image and feature information of the standard facial image using a pre-trained recognition model, and calculating a Euclidean distance between the feature information of the single facial generative image and the feature information of the standard facial image; and obtaining the loss function of the initial generative model based on the probability and the Euclidean distance.

7. The apparatus according to claim 6, wherein the initial generative model is trained and obtained by:

using at least two frames of initial training facial sample images extracted from an initial training video as an input, and using a preset initial training facial image as an output by using a machine learning method to train and obtain the initial generative model, the at least two frames of initial training facial sample images and the initial training facial image containing the facial information of the same person.

8. The apparatus according to claim 6, wherein the discriminative model is trained and obtained by:

using a first sample image as an input and using annotation information of the first sample image as an output by using the machine learning method to train and obtain the discriminative model, the first sample image comprising a positive sample image with annotation information and a negative sample image with annotation information, wherein the negative sample image is an image outputted by the generative model.

9. The apparatus according to claim 6, wherein the recognition model is trained and obtained by:

using a second sample image as an input and feature information of the second sample image as an output by using the machine learning method to train and obtain the recognition model.

10. The apparatus according to claim 6, wherein the generative model is a Long-Short Term Memory Model.

11. A non-transitory computer medium storing a computer program, wherein the computer program, when executed by a processor, causes the processor to perform operations, the operations comprising:

acquiring at least two frames of facial images of a same person extracted from a target video; and inputting the at least two frames of facial images of the same person into one pre-trained generative model to generate a single facial image, wherein the generative model is obtained through:

inputting a single facial generative image outputted by an initial generative model into a pre-trained discriminative model to generate a probability of the single facial generative image being a real facial image;

determining a loss function of the initial generative model based on the probability and a similarity between the single facial generative image and a standard facial image, the similarity including a Jaccard similarity coefficient between the single facial generative image and the standard facial image, or a Euclidean distance between the single facial generative image and the standard facial image, the standard facial image and the single facial generative image containing facial information of the same person; and updating a model parameter of the initial generative model using the loss function determined based on the probability and the similarity to obtain the generative model, wherein determining the loss function of the initial generative model comprises:

extracting respectively feature information of the single facial generative image and feature information of the standard facial image using a pre-trained recognition model, and calculating a Euclidean distance between the feature information of the single facial generative image and the feature information of the standard facial image; and obtaining the loss function of the initial generative model based on the probability and the Euclidean distance.

12. The non-transitory computer medium according to claim 11, wherein the initial generative model is trained and obtained by:

using at least two frames of initial training facial sample images extracted from an initial training video as an input, and using a preset initial training facial image as an output by using a machine learning method to train and obtain the initial generative model, the at least two frames of initial training facial sample images and the initial training facial image containing the facial information of the same person.

13. The non-transitory computer medium according to claim 11, wherein the discriminative model is trained and obtained by:

using a first sample image as an input and using annotation information of the first sample image as an output by using the machine learning method to train and obtain the discriminative model, the first sample image comprising a positive sample image with annotation information and a negative sample image with annotation information, wherein the negative sample image is an image outputted by the generative model.

14. The non-transitory computer medium according to claim 13, wherein the recognition model is trained and obtained by:

using a second sample image as an input and feature information of the second sample image as an output by using the machine learning method to train and obtain the recognition model.

15. The non-transitory computer medium according to claim 11, wherein the generative model is a Long-Short Term Memory Model.

\* \* \* \* \*